US009704455B2

United States Patent
Sakurai et al.

(10) Patent No.: US 9,704,455 B2
(45) Date of Patent: Jul. 11, 2017

(54) INFORMATION DISPLAY APPARATUS AND INFORMATION DISPLAY METHOD FOR SUPERIMPOSING ADDITIONAL INFORMATION ON AN IMAGE (71) Applicant: YOKOGAWA ELECTRIC CORPORATION, Musashino-shi, Tokyo (JP)

(72) Inventors: Yasuki Sakurai, Tokyo (JP); Yousuke Ishii, Tokyo (JP); Kenji Oishi, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 536 days.

(21) Appl. No.: 14/283,808

(22) Filed: May 21, 2014

(65) Prior Publication Data

US 2014/0368541 A1    Dec. 18, 2014

(30) Foreign Application Priority Data

Jun. 13, 2013 (JP) ................... 2013-124832

(51) Int. Cl.
*G09G 5/377* (2006.01)
*G06T 19/00* (2011.01)
(Continued)

(52) U.S. Cl.
CPC .......... *G09G 5/377* (2013.01); *G06F 3/0488* (2013.01); *G06F 3/04847* (2013.01);
(Continued)

(58) Field of Classification Search
CPC . G06T 19/006; G06T 15/50; G06F 17/30247; G06F 3/0488; G06K 9/00671; H04N 5/23229; H04N 9/73
See application file for complete search history.

(56) References Cited

U.S. PATENT DOCUMENTS

| 2006/0109221 A1* | 5/2006 | Park | G09G 3/20 345/88 |
| 2009/0013052 A1* | 1/2009 | Robarts | G06F 17/30867 709/206 |
| 2009/0215471 A1* | 8/2009 | Sands | G01S 13/876 455/457 |
| 2009/0278766 A1* | 11/2009 | Sako | G02B 27/017 345/8 |
| 2011/0128296 A1 | 6/2011 | Mihara et al. | |
| 2011/0164163 A1* | 7/2011 | Bilbrey | G06F 1/1694 348/333.01 |
| 2011/0249153 A1 | 10/2011 | Hirooka et al. | |
| 2012/0105477 A1 | 5/2012 | Park | |
| 2012/0224068 A1 | 9/2012 | Sweet, III | |
| 2014/0015857 A1* | 1/2014 | Smith | G06T 11/60 345/629 |

(Continued)

FOREIGN PATENT DOCUMENTS

EP    2397819 A1    12/2011
JP    11-234651 A    8/1999
(Continued)

*Primary Examiner* — Michelle L Sams
(74) *Attorney, Agent, or Firm* — Sughrue Mion, PLLC (57) ABSTRACT An information display apparatus includes an image pick-up unit configured to picking up an image, a display unit configured to display the image picked up by the image pick-up unit, a first correcting unit configured to correct the image picked up by the image pick-up unit to generate a first image, a second correcting unit configured to correct the image picked up by the image pick-up unit to generate a second image, a recognizing unit configured to recognize the second image generated by the second correcting unit, and a display control unit configured to display an additional information according to a result of the recognition performed by the recognizing unit with superimposing the additional information on the first image generated by the first correcting unit on the display unit.

17 Claims, 7 Drawing Sheets (51) Int. Cl.
*G06F 17/30* (2006.01)
*G06K 9/00* (2006.01)
*G06F 3/0488* (2013.01)
*G06F 3/0484* (2013.01)
*H04N 5/232* (2006.01)
*G06T 5/00* (2006.01)
*G06T 15/50* (2011.01)
*H04N 9/73* (2006.01)

(52) U.S. Cl.
CPC ... *G06F 17/30247* (2013.01); *G06K 9/00671* (2013.01); *G06T 5/009* (2013.01); *G06T 19/006* (2013.01); *H04N 5/23229* (2013.01); *G06T 15/50* (2013.01); *H04N 9/73* (2013.01)

(56) References Cited

U.S. PATENT DOCUMENTS

2014/0104441 A1* 4/2014 Rime .................. H04N 5/2621
348/207.1

FOREIGN PATENT DOCUMENTS

| | | |
|---|---|---|
| JP | 2005-115500 A | 4/2005 |
| JP | 2008-5081 A | 1/2008 |
| JP | 2011-117997 A | 6/2011 |
| WO | 2010/084731 A1 | 7/2010 |

* cited by examiner

INFORMATION DISPLAY APPARATUS AND INFORMATION DISPLAY METHOD FOR SUPERIMPOSING ADDITIONAL INFORMATION ON AN IMAGE

BACKGROUND OF THE INVENTION

Field of the Invention

The present invention relates to an information display apparatus and an information display method.

Priority is claimed on Japanese Patent Application No. 2013-124832, filed Jun. 13, 2013, the content of which is incorporated herein by reference.

Description of Related Art

Recently, research and development of AR (Augmented Reality) augmenting real environment perceived by human being have been becoming popular. Typical examples of using AR technology may be mobile terminals such as smart phones superimposing, on the image of the real environment, additional information which depends on an image picked-up by an accessory camera, and displaying the superimposed image on a display apparatus. Capability for AR technology to add any types of information to the real environment will allow a wide variety of application of the AR technology to amusement such as games, guidance in museums or event sites, and medical support.

AR technology set forth above is classified into "Location-based AR" and "Vision-based AR". "Location-based AR" is a technology presenting information by using location information obtained from GPS (Global Positioning System) or the like. "Vision-based AR" is a technology presenting information based on a result of recognizing an image picked-up by a camera. "Vision-based AR" is further classified into "Marker-based AR" presenting information by recognizing a predetermined graphic called "Marker" and "Marker-less AR" presenting information by recognizing a real object without using "Marker".

Japanese Unexamined Patent Application Publication No. 2005-115500 discloses an example of an apparatus for presenting information by "Marker-based AR". Specifically, Japanese Unexamined Patent Application Publication No. 2005-115500 discloses an apparatus recognizing a camera position (a distance between the marker and the camera) and an angle (an angle of the camera to the marker), obtaining information related to a position of the marker by reading a description of the marker, superimposing the obtained information on the image picked-up by the camera. Also, the patent reference discloses the apparatus matching the obtained information to the camera position and the angle, and displaying the superimposed image.

Japanese Unexamined Patent Application Publication No. 11-234651 unrelated to AR technology discloses a monitoring camera apparatus for obtaining a high visibility monitoring image on which a television signal and an image sensing signal for high speed image processing are superimposed. The monitoring camera apparatus disclosed in Japanese Unexamined Patent Application Publication No. 11-234651 includes a monitoring camera unit configured to obtain the television signal for image monitoring, an image sensing unit configured to obtain the image sensing signal for the high speed image processing, and a signal adding device configured to superimpose the television signal on the image sensing signal.

As described above, AR technology is a technology basically presenting (displaying) the augmented real environment to a user. The apparatuses disclosed in the patent references have a function of automatically adjusting white balance and exposure according to photographic environments such as brightness of a photographic object, existence or non-existence of a shadow, or the like. The apparatus adjusts the image to be easily viewable to a user, and displays the adjusted image.

Adjusting the camera-picked-up image to be easily viewable to a user can improve the visibility to the user regardless of the photographic environments. But the image adjusted to be easily viewable to a user is not always suitable for the image recognition. For this reason, for example, "Vision-based AR" described above is unable to recognize the image picked up by the camera and unable to provide the additional information.

In these situations, if the user continues photographing the photographic object while shifting the position of the mobile terminal device and turning the mobile terminal device, there will be a non-zero possibility that the additional information may be displayed. However, in a case where AR technology described above is used to support maintenance of field devices in a plant or a factory, no provision of the additional information will cause decrease in working efficiency and mistakes.

On the other hand, adjusting the camera-picked-up image to be suitable for the image recognition will reduce a risk that the additional information is not provided. However, it remains possible that the image adjusted to be suitable for the image recognition is not easily recognizable by the user. The above-described method of displaying superimposed image can cause a poor visibility to raise a risk that the image and the additional information are not easily recognizable by a user, resulting in possible decrease in working efficiency and some mistakes.

SUMMARY OF THE INVENTION

An information display apparatus may include an image pick-up unit configured to picking up an image, a display unit configured to display the image picked up by the image pick-up unit, a first correcting unit configured to correct the image picked up by the image pick-up unit to generate a first image, a second correcting unit configured to correct the image picked up by the image pick-up unit to generate a second image, a recognizing unit configured to recognize the second image generated by the second correcting unit, and a display control unit configured to display an additional information according to a result of the recognition performed by the recognizing unit with superimposing the additional information on the first image generated by the first correcting unit on the display unit.

DETAILED DESCRIPTION OF THE INVENTION

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An information display apparatus and an information display method according to embodiments of the present invention will be described below in detail, with references to the drawings.

First Embodiment

Figure 1:
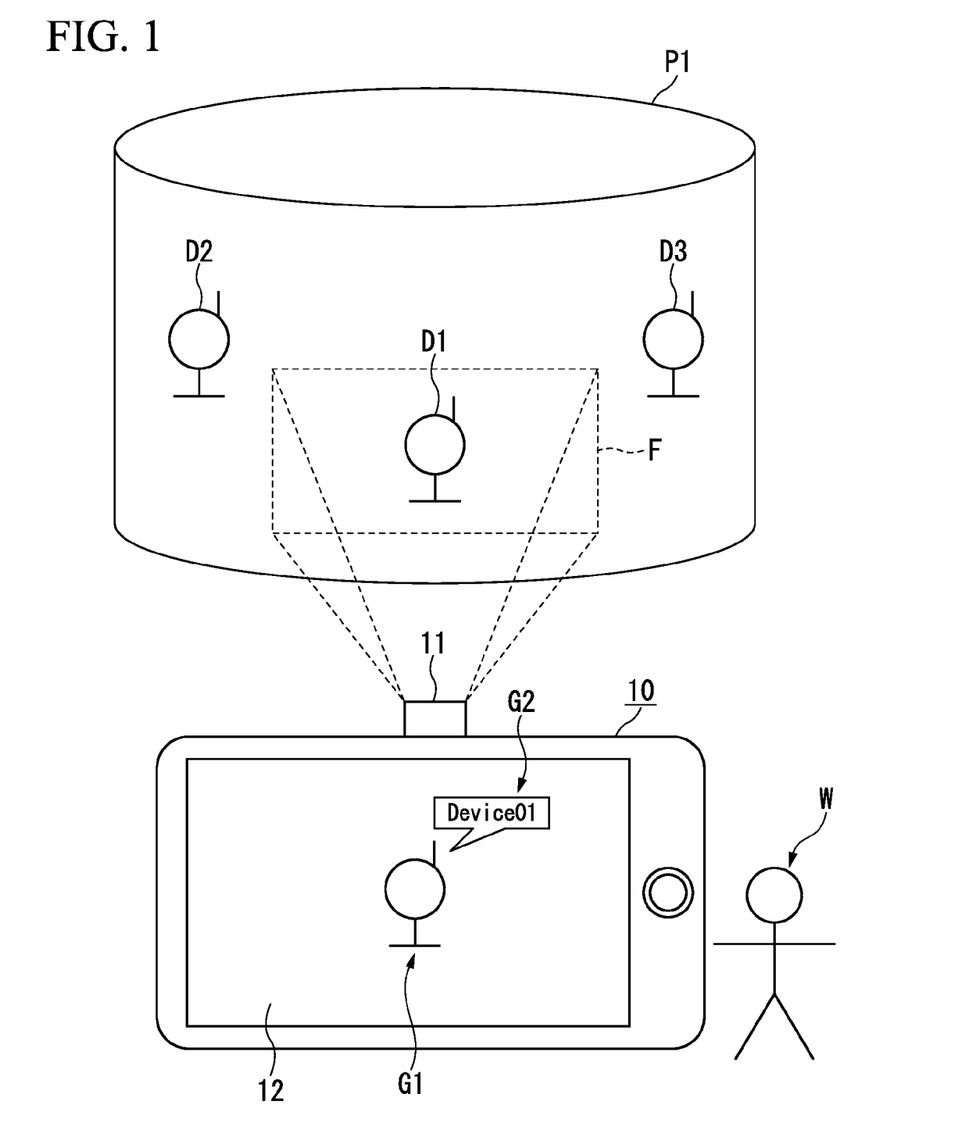
FIG. 1 is a drawing illustrating an information display apparatus in use according to the first embodiment of the present invention.

FIG. 1 is a drawing illustrating an information display apparatus in use according to the first embodiment of the present invention. As shown in FIG. 1, an information display apparatus 10 of the present embodiment is operated by a worker W such as a user. When the worker W maintains field devices D1 to D3, the information display apparatus 10 is to provide the worker W, who maintains field devices D1 to D3, with work support information (additional information) of the field devices D1 to D3. The work support information described above is any types of information capable of supporting maintenance of the field devices D1 to D3 by the worker W. In the present embodiment, the work support information may be, but is not limited to, a set of tag information (identification information) assigned uniquely to each of the field devices D1 to D3. The following descriptions will be made in a case that the work support information is the set of tag information.

Each of the field devices D1 to D3 may be any one of a flow meter, a sensor unit such as a temperature sensor, a valve unit such as a flow control valve and an on-off valve, an actuator unit such as a fan and a motor, an image pick-up unit such as a camera and a camcorder for picking up images of environments and objects in a plant, an audio unit such as a microphone and a speaker for collecting an abnormal noise in the plant and emitting a warning sound, a position detection unit for outputting an position information of the field devices, and other units set up in the plant. For example, the field devices D1 to D3 perform wireless communication conformed to the standards such as ISA100.11a or WirelessHART (registered trademark), or perform wired communication via a cable network (not shown) laid in the plant. A cylindrical mark labeled by P1 represents a facility such as a tank in which the field devices D1 to D3 are set up.

The image display apparatus 10 displays an image G2 superimposed on an image G1. The image G1 is an image which has been picked-up by a camera 11, and then adjusted in white balance and exposure. The image G2 represents tag information which is work support information of the field device D1. The information display apparatus 10 is to provide information by "Marker-based AR" in "Vision-based AR". The information display apparatus 10 is to recognize a marker (a predetermined reference image) placed on the field devices D1 to D3, and to generate the image G2 representing the tag information according to the recognized marker. The marker will be described in detail.

In the example shown in FIG. 1, the image G1 displayed on a touch panel 12 is an image obtained by imaging the field device D1 (an image in a visual field F of the camera 11). The image G2 is an image of marked-up-balloon "Device01" which is the tag information of the field device D1. The information display apparatus 10, in accordance with operation of the worker W, sends a setting of the field device D1 and an instruction of management to a server apparatus (not shown) via a network (not shown). The worker W enters ID and PASSWORD to use the information display apparatus 10.

Figure 2:
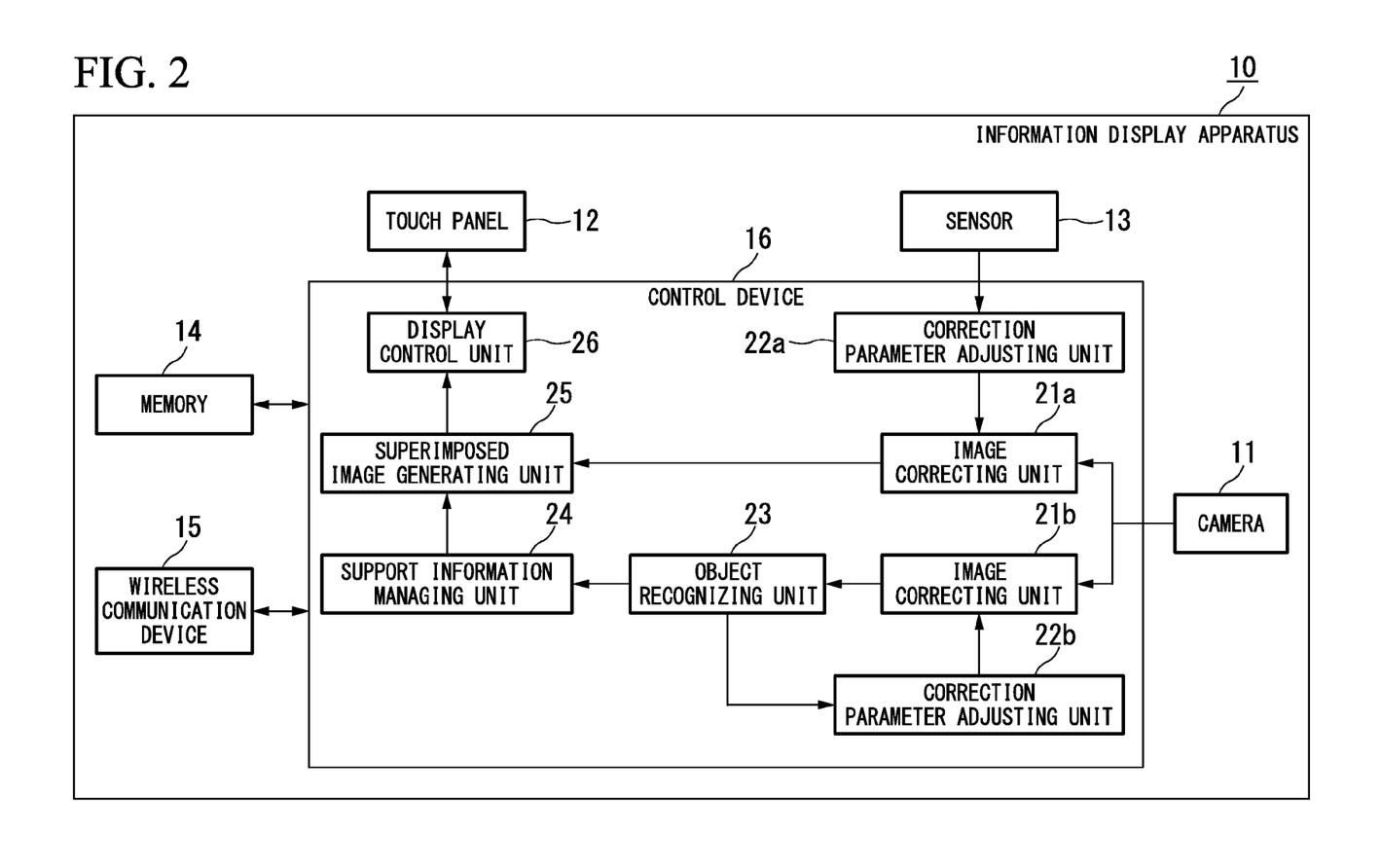
FIG. 2 is a block diagram of a main part of the information display apparatus according to the first embodiment of the present invention.

FIG. 2 is a block diagram of a main part of the information display apparatus according to the first embodiment of the present invention. As shown in FIG. 2, the information display apparatus 10 includes a sensor 13 (a first correcting unit), a memory 14, a wireless communication device 15, and a control device 16 in addition to the camera 11 (an imaging unit) and the touch panel 12 (a display unit). The camera 11 may include CCD (Charge Coupled Device), COMS (Complementary Metal Oxide Semiconductor), or the like. The camera 11 can take a stationary picture and a motion picture. The touch panel 12 may include a touch-screen which enables an operator to interact directly with what is displayed, rather than using an intermediate device such as a mouse or a touch pad. The touch panel 12 can be configured by functions of a display such as a liquid crystal display or electro luminescence display in combination with functions of a pointing device.

The sensor 13 may be a brightness sensor attached to a housing of the information display apparatus 10. For example, the sensor 13 can be used for detecting brightness in the photographic environments during picking up images with the camera 11. For the sensor 13, there can be used a luminance sensor using a photodiode, a phototransistor, or a photo resistor. The memory 14 can be implemented by a storage device such as a semiconductor memory or a HDD (hard disk drive). The memory 14 stores a variety of information which is to be used by the control device 16. Under control by the control device 16, the wireless communication device 15 performs wireless communication in conformity with the wireless communication standards such as Wi-Fi (registered trademark), WiMAX (registered trademark), or 3G/LTE (registered trade mark).

The control device 16 generates the image G2 representing the tag information of the field devices D1 to D3. The control device 16 superimposes the image G2 on the image G1, and displays the superimposed image on the touch panel 12 (see FIG. 1). The image G1 is a picked-up image of the camera 11, and adjusted white balance and exposure. The image G2 represents tag information of the field devices D1 to D3. The control device 16 corrects the image G1 taken with the camera 11 to be suitable for displaying on the touch panel 12 by using the detection result of the sensor 13. Also, the control device 16 corrects the image G1 to be suitable for image recognition necessary for generating the image G2.

The control device 16 displays a designation screen for designating a setting and a management of the field devices D1 to D3 on the touch panel 12 in accordance with an operation of the touch panel 12 by the worker W. Also, the control device 16 sends a designation according to an operation of the designation screen to a server apparatus (not shown) via a network (not shown). As the information display apparatus 10 of the present embodiment has a characteristic in a process for displaying the images G1 and G2, detail explanations of the setting and the management of the field devices D1 to D3 are left out.

The control device 16 includes an image correcting unit 21a, an image correcting unit 21b, a correction parameter adjusting unit 22a, a correction parameter adjusting unit 22b, an object recognizing unit 23, a support information managing unit 24, a superimposed image generating unit 25, and a display control unit 26. A CPU (Central Processing Unit) of the control device 16 runs a program to substantialize the image correcting unit 21b, the correction parameter adjusting unit 22b, the object recognizing unit 23, the support information managing unit 24, and the superimposed image generating unit 25.

The image correcting unit 21a corrects the picked-up image of the camera 11, and outputs the image (first image) suitable for displaying on the touch panel 12. Specifically, the image correcting unit 21a corrects white balance and exposure by using a correction parameter adjusted by the correction parameter adjusting unit 22a. The image correcting unit 21b corrects the picked-up image of the camera 11, and outputs the image (second image) suitable for the image recognition process of the recognizing unit 23. Specifically, the image correcting unit 21b corrects white balance and exposure by using a correction parameter adjusted by the correction parameter adjusting unit 22b.

The correction parameter adjusting unit 22a adjusts the correction parameter to be used in the image correcting unit 21a in accordance with the photographic environments so that a high visibility image is displayed on the touch panel 12. For example, the correction parameter adjusting unit 22a preliminarily reads out a correction table stored in the memory 14. The correction table is a table designating a relation between a detection signal output from the sensor 13 and a correction parameter for displaying a high visibility image. The correction parameter adjusting unit 22a obtains the correction parameter according to the detection signal output from the sensor 13 from the correction table. Also, the correction parameter adjusting unit 22a adjusts the correction parameter to be used in the image correcting unit 21a.

The correction parameter adjusting unit 22b adjusts the correction parameter to be used in the image correcting unit 21b so that the marker placed on the field devices D1 to D3 is recognized by the object recognizing unit 23. Specifically, the correction parameter adjusting unit 22b adjusts the correction parameter based on whether the marker placed on the field devices D1 to D3 is recognized or not. For example, the correction parameter adjusting unit 22b gradually increases or decreases the correction parameter to be used in the image correcting unit 21b until the marker is recognized by the object recognizing unit 23. In other words, the correction parameter adjusting unit 22b gradually changes the correction parameter to be used in the image correcting unit 21b while the marker is not recognized by the object recognizing unit 23.

Figure 3:
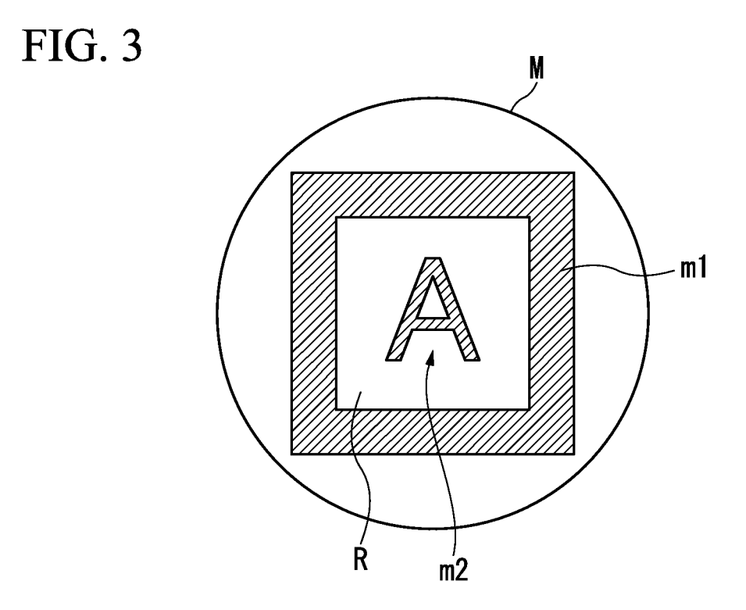
FIG. 3 is a drawing illustrating an exemplary of the marker used in the first embodiment of the present invention.

The object recognizing unit 23 recognizes the image output from the image correcting unit 21b, and recognizes the marker in the image. FIG. 3 is a drawing illustrating an exemplary of the marker used in the first embodiment of the present invention. As shown in FIG. 3, for example, the marker M is a discoid-shaped plate comprising a rectangular marker part m1 and a marker part m2 arranged in the marker part m1. The marker part m1 and the marker part m2 are arranged in the same side of the plate. The marker part m1 is a graphic for recognizing the marker M in a short time and easily. The marker part m2 represents information assigned uniquely to each marker M. In the FIG. 3, although the marker part m2 is a character "A" to set forth simply, the marker part m2 may alternatively be a plurality of characters, graphics, a combination of a character and a graphic, or the like.

The object recognizing unit 23 executes an edge extraction process, a rectangular recognizing process, and a pattern matching process so that the object recognizing unit 23 can recognize the marker M. The edge extraction process is a process for extracting an edge in which brightness of the image output from the image correcting unit 21b is drastically changed. The rectangular recognizing process is a process for recognizing the rectangular marker part m1 from the edge extracted in the edge extraction process.

The pattern matching process is a process for comparing a template image of the marker part m2 stored in the memory 14 with an image of a marker area R surrounded by the marker part m1 recognized in the rectangular recognizing process, and determining if the image of the marker area R matches the template image. In the pattern matching process, for example, the object recognizing unit 23 calculates a correlation between the template image of the marker part m2 and the image of the marker area R so that the object recognizing unit 23 can determine if the image of the marker area R matches the template image. For example, the wireless communication device 15 communicates with the server (not shown) so that the template image used in the pattern matching process can be updated.

The support information managing unit 24 manages the tag information which is the support information of the field devices D1 to D3. Specifically, if the object recognizing unit 23 recognizes the image of the marker M, the support information managing unit 24 reads out the tag information according to a recognition result of the object recognizing unit 23 from the memory 14. Also, the support information managing unit 24 generates the image G2 of the tag information read out from the memory 14. For example, the wireless communication device 15 receives tag information from the server (not shown) and supply the tag information to the support information managing unit 24, so that the support information managing unit 24 can replace the tag information supplied from the wireless communication device 15 for the tag information stored in the memory 14.

The superimposed image generating unit 25 superimposes the image G2 generated by the support information managing unit 24 on the image G1 output from the image correcting unit 21a, and generates the superimposed image. The image G1 is the picked-up image of the camera 11, and adjusted white balance and exposure. The display control unit 26 controls the touch panel 12 and executes an input process with the touch panel 12. Specifically, the display control unit 26 displays the superimposed image generated by the superimposed image generating unit 25 on the touch panel 12. Also, the display control unit 26 sends a designation of the worker W to the control device 16 in accordance with an operation of the worker W to the touch panel 12.

Figure 4:
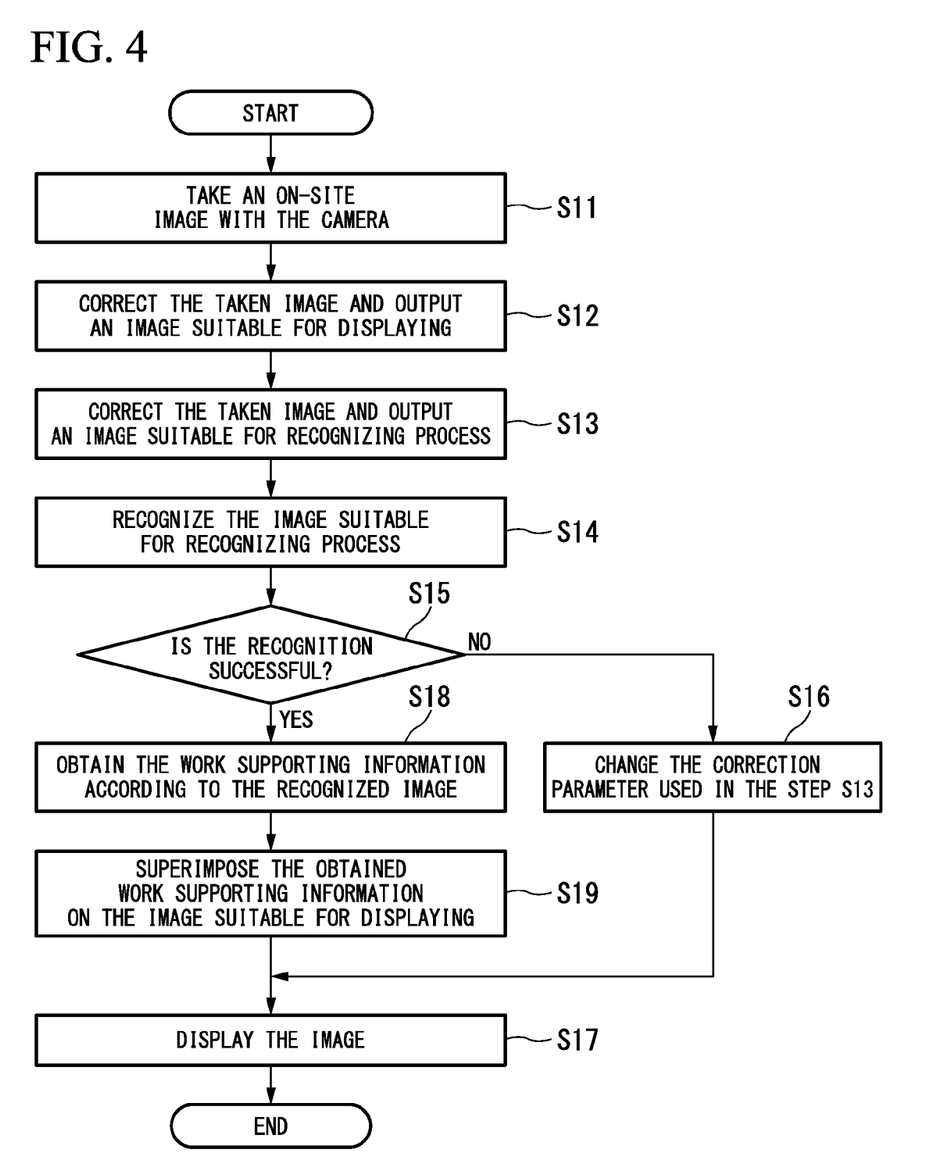
FIG. 4 is a flowchart showing the operation of the image display apparatus 10 in the first embodiment of the present invention.

Next, following is a description of the image display apparatus 10. FIG. 4 is a flowchart showing the operation of the image display apparatus 10 in the first embodiment of the present invention. The image display apparatus 10 of the first embodiment has an ordinary display mode and a superimposed image display mode. In the ordinary display mode, the picked-up image of the camera 11 is displayed on the touch panel 12 without superimposing. In the superimposed image display mode, the superimposed image is displayed on the touch panel 12. For example, the flowchart of FIG. 4 is started right after the superimposed image display mode is set by the worker 12 operating the touch panel 12. The flowchart of FIG. 4 is repeated at constant time interval such as about 0.05 second to 0.5 second.

When the superimposed image display mode of the image display apparatus 10 is set, the camera 11 takes a photograph (Step S11). The image display apparatus 10 is operated by the worker W so that the camera 11 faces the field device D1 placed in the plant. As shown in FIG. 1, the image of the field device D1 in the visual field F is taken by the camera 11. The image picked up by the camera 11 is output to the image correcting unit 21a and the image correcting unit 21b of the control device 16 respectively.

When the image picked up by the camera 11 is input to the image correcting unit 21a, the image is corrected to be suitable for displaying on the touch panel 12, and the corrected image is output from the image correcting unit 21a (Step S12). Specifically, the correction parameter adjusting unit 22a adjusts the correction parameter in accordance with the detection signal output from the sensor 13. The image correcting unit 21a corrects the white balance and the exposure of the image input from the camera 11 by using the correction parameter adjusted by the correction parameter adjusting unit 22a. Also, the image correcting unit 21a outputs the corrected image.

When the image picked up by the camera 11 is input to the image correcting unit 21b, the image is corrected to be suitable for the recognition process of the object recognizing unit 23, and the corrected image is output from the image correcting unit 21a (Step S13). Specifically, the correction parameter adjusting unit 22b sets a default value of the correction parameter. The image correcting unit 21b corrects the white balance and the exposure of the image input from the camera 11 by using the correction parameter adjusted by the correction parameter adjusting unit 22b. Also, the image correcting unit 21b outputs the corrected image. The process of Step S13 may be executed before Step S12. Also, the process of Step S13 may be executed in parallel with Step S12.

Next, the object recognizing unit 23 executes the recognition process for recognizing the image output from the image correcting unit 21b (Step S14). Specifically, the object recognizing unit 23 executes the edge extraction process for extracting the edge in which brightness of the image output from the image correcting unit 21b is drastically changed. Also, the object recognizing unit 23 executes the rectangular recognizing process for recognizing the rectangular marker part m1 (shown in FIG. 3) from the edge extracted in the edge extraction process.

Next, the object recognizing unit 23 executes the pattern matching process for comparing the template image of the marker part m2 stored in the memory 14 with the image of the marker area R (shown in FIG. 3), and determining if the image of the marker area R matches the template image. In the pattern matching process, for example, the object recognizing unit 23 calculates the correlation between the template image and the image of the marker area R. Also, the object recognizing unit 23 determines if the calculated correlation exceeds a predetermined threshold value (for example, from 0.8 to 0.9).

After the end of the recognition process of the object recognizing unit 23, the control device 16 determines if the recognition is successful (Step S15). For example, the determination is executed according to whether the calculated correlation exceeds the predetermined threshold value or not. If the recognition process is unsuccessful (determination result of the step S15 is "NO"), the control device 16 controls the correction parameter adjusting unit 22b to change the correction parameter to be used in the image correcting unit 21b (Step S16). For example, the correction parameter adjusting unit 22b increases or decreases the correction parameter by from 5% to 10% of a max variable amount of the correction parameter.

After the end of the adjusting process of the correction parameter, the display control unit 26 displays the image on the touch panel 12 (Step S17). If the recognition process of the object recognizing unit 23 is unsuccessful (determination result of the step S15 is "NO"), the tag information as the support information cannot be obtained. Therefore, the image output from the image correcting unit 21a is displayed on the touch panel 12 without being superimposed the tag information by the superimposed image generating unit 25. For this reason, only the image G1 is displayed on the touch panel 12, as is the case in the ordinary display mode. The image G1 is an image which taken with the camera 11, of which the white balance and the exposure of the G1 were corrected. After the image is displayed on the touch panel 12, the process of the flowchart shown in the FIG. 4 ends.

After a certain period of time, the process of the flowchart shown in FIG. 4 is started, and the processes from Step S11 to Step S15 are executed again. If the recognition process is unsuccessful (determination result of the step S15 is "NO"), the control device 16 controls the correction parameter adjusting unit 22b again to change the correction parameter to be used in the image correcting unit 21b (Step S16). In this way, the correction parameter adjusting unit 22b has repeated the process for changing the correction parameter while the determination result of the step S15 is "NO". The correction parameter to be used in the image correcting unit 21b is gradually adjusted.

Figure 5:
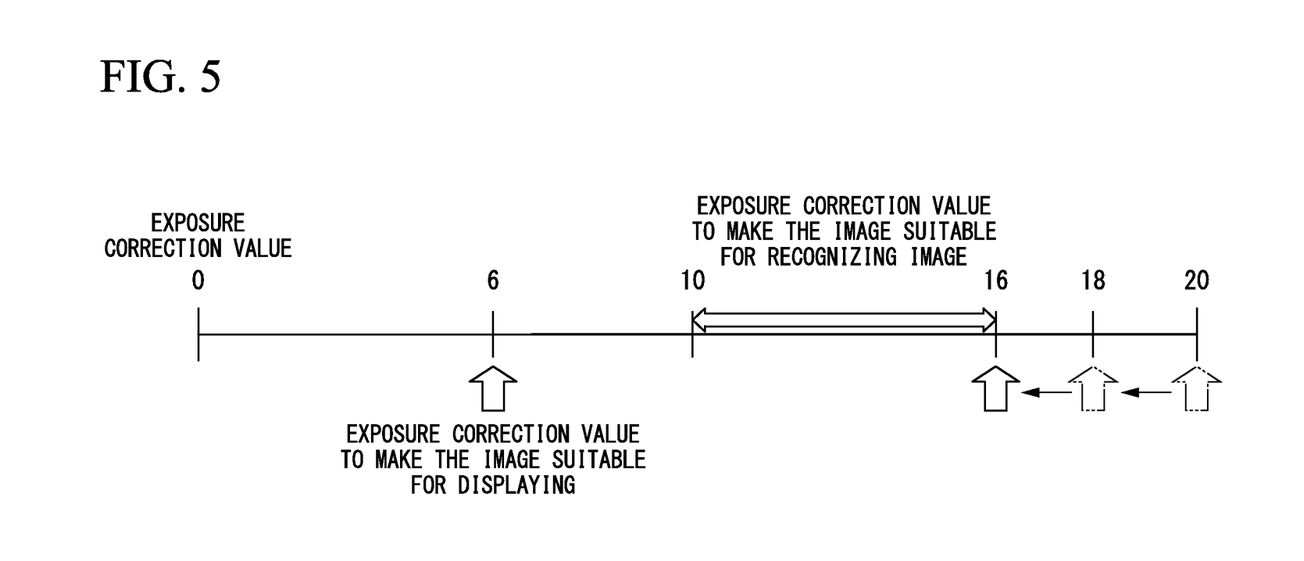
FIG. 5 is a drawing illustrating an exemplary adjustment of the correction parameter in the first embodiment of the present invention.

FIG. 5 is a drawing illustrating an exemplary adjustment of the correction parameter in the first embodiment of the present invention. As shown in FIG. 5, the exposure of the picked-up image of the camera 11 is adjustable within an exposure correction value from "0" to "20". A range of the correction parameter for adjusting the exposure is from "0" to "20". The correction parameter is adjustable in the correction parameter adjusting unit 22a and the correction parameter adjusting unit 22b.

Also, in the example shown in the FIG. 5, the exposure correction value to make the picked-up image of the camera 11 suitable for displaying on the touch panel 12 is "6", and the exposure correction value to make the picked-up image of the camera 11 suitable for the image recognition is in a range from "10" to "16". In other words, when the correction parameter adjusting unit 22b sets the correction parameter for adjusting the exposure in the range from "10" to "16", the image recognition is successful with high probability.

As described above, the correction parameter adjusting unit 22b has repeated the process for changing the correction parameter while the determination result of the step S15 is "NO" (Step S16). As shown in FIG. 5, if a default value of the correction parameter for adjusting the exposure, which used in the image correcting unit 21b, is set to "20", the correction parameter adjusting unit 22b sequentially executes a process for decreasing the value by "2". In the decreasing process, the correction parameter adjusting unit 22b changes the correction parameter into "18" and next into "16" after that. In the present embodiment, the exposure correction value (correction parameter) is adjusted (decreased) gradually. Namely, the exposure correction value is changed so as to make the picked-up image of the camera 11 suitable for displaying on the touch panel 12.

The above descriptions of the embodiments took the example that the default value of the correction parameter is set to "20", and the value is decreased by "2" while the determination result of the step S15 is "NO". However, the default value of the correction parameter and the change amount of the value may be set arbitrarily. For example, if the default value is set to "0", the value may be increased by "2".

On the other hand, in the flowchart shown in FIG. 4, if the control device 16 determines that the recognition process is successful (determination result of the step S15 is "YES"), the recognition result is output to the support information managing unit 24. The support information managing unit 24 obtains the tag information according to the recognition result in the memory 14, and generates the image G2 representing the obtained tag information (Step S18).

The image G2 generated by the support information managing unit 24 is output to the superimposed image generating unit 25. The superimposed image generating unit 25 superimposes the image G2 on the image G1 output from the image correcting unit 21a (Step S19). After that, the display control unit 26 displays the image on the touch panel 12 (Step 17). Specifically, the superimposed image generated by the superimposed image generating unit 25 is displayed on the touch panel 12. Therefore, as shown in FIG. 1, the image G2 superimposed on the image G1 is displayed on the touch panel 12. The image G1 is an image corrected the white balance and the exposure, and the image G2 is an image according to the tag information.

As described above, in the present embodiment, the picked-up image of the camera 11 is corrected to be suitable for displaying on the touch panel 12, and the corrected image (image G1) is output. Also, in the present embodiment, the picked-up image of the camera 11 is corrected to be suitable for the recognition process in the object recognizing unit 23, and the corrected image (image G2) is output. Further, in the present embodiment, the tag information according to the recognition result of the object recognizing unit 23 is superimposed on the image G1, and the superimposed image is displayed on the touch panel 12. Because the image easily viewable for the worker W is displayed on the touch panel 12 and the image suitable for image recognition is input to the object recognizing unit 23, it is possible to improve the visibility of the image for the worker W and to improve the recognition rate.

Also, because the worker W can recognize the picked-up image of the camera 11 and the tag information as the work support information, it is possible to prevent a decline of a working efficiency and prevent a mistake. Additionally, because the CPU runs the program to substantialize the image correcting unit 21b, the correction parameter adjusting unit 22b, the object recognizing unit 23, the support information managing unit 24, and the superimposed image generating unit 25, it is possible to prevent an increase in production cost.

Second Embodiment

Figure 6:
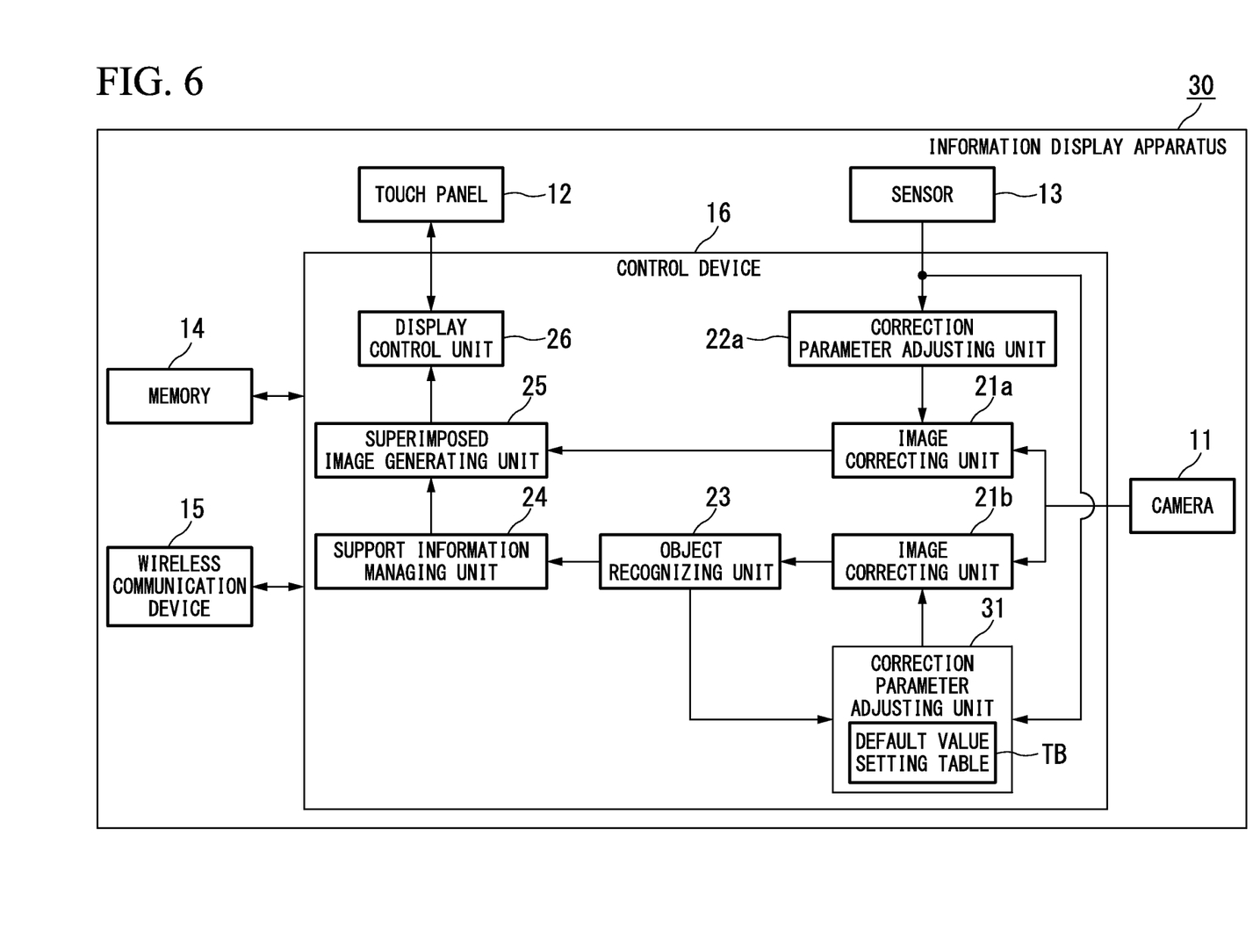
FIG. 6 is a block diagram of a main part of the information display apparatus according to second embodiment of the present invention.

FIG. 6 is a block diagram of a main part of the information display apparatus according to second embodiment of the present invention. As shown in FIG. 6, the information display apparatus 30 of the present embodiment includes a correction parameter adjusting unit 31 in place of the correction parameter adjusting unit 22b of the information display apparatus 10 shown in FIG. 2. The information display apparatus 30 differs from the information display apparatus 10 in a setting method of a default value to be used in the image correcting unit 21b. The information display apparatus 30 is capable of changing an adjusting method in accordance with the recognition result of the object recognizing unit 23.

The correction parameter adjusting unit 31, same as the correction parameter adjusting unit 22b shown in FIG. 2, adjusts the correction parameter to be used in the image correcting unit 21b so that the object recognizing unit 23 can recognize the marker placed on the field devices D1 to D3. The correction parameter adjusting unit 31 has a default value setting table TB (table). The correction parameter adjusting unit 31 differs from the correction parameter adjusting unit 22b in a setting of the default value of the correction parameter by using the default value setting table TB.

The default value setting table TB is a table in which the detection result of the sensor 13 is related to a setting value of the correction parameter when the recognition process of the object recognizing unit 23 was successful in the past. When an operation mode of the information display apparatus 30 is set to the superimposed image display mode, the correction parameter adjusting unit 31 reads out the correction parameter according to the detection result of the sensor 13 from the default value setting table TB, and sets the correction parameter as the default value.

Figure 7:
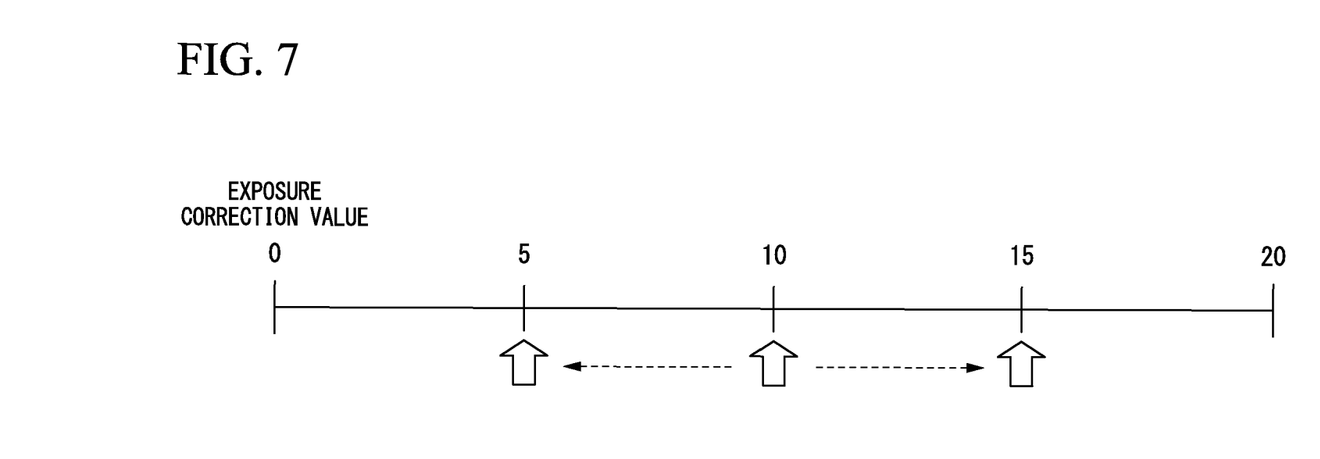
FIG. 7 is a drawing illustrating the adjusting method in the second embodiment of the present invention.

After the correction parameter adjusting unit 31 sets the default value of the correction parameter, the correction parameter adjusting unit 31 determines the adjusting method of the correction parameter in accordance with the recognition result of the object recognizing unit 23 when at least two correction parameters differing from each other are set. FIG. 7 is a drawing illustrating the adjusting method in the second embodiment of the present invention. In the present embodiment, to set forth simply, the default value of the correction parameter for adjusting the exposure to be used in the image correcting unit 21b is set to "10".

As shown in FIG. 7, for example, after the correction parameter adjusting unit 31 sets the default value of the correction parameter to "10", the correction parameter adjusting unit 31 sequentially sets the correction parameter to "5" and "15" differing from the default value "10" by "5". The correction parameter adjusting unit 31 obtains the recognition result of the object recognizing unit 23 when the correction parameter is set to "5". Also, the correction parameter adjusting unit 31 obtains the recognition result of the object recognizing unit 23 when the correction parameter is set to "15". Further, the correction parameter adjusting unit 31 determines the adjusting method of the correction parameter in accordance with the recognition results respectively. For example, the adjusting method is whether increasing the correction parameter or decreasing the correction parameter. Specifically, if a correlation value in a case of "15" is larger than a correlation value in a case of "5", the correction parameter adjusting unit 31 determines to increase the correction parameter.

The information display apparatus 30 differs from the information display apparatus 10 in setting the default value of the correction parameter to be used in the image correcting unit 21b, and changing the adjusting method of the correction parameter in accordance with the recognition result of the object recognizing unit 23. However, the information display apparatus 30 basically executes the same process of the flowchart shown in FIG. 4. Therefore, after the process for setting the default value of the correction parameter and the process for determining the adjusting method of the correction parameter, the information display apparatus 30 executes the process of the flowchart shown in FIG. 4. To avoid repeating the same explanation, a detail explanation of the information display apparatus 30 is left out.

As described above, in the present embodiment, the picked-up image of the camera 11 is corrected to be suitable for displaying on the touch panel 12, and the corrected image (image G1) is output. Also, in the present embodiment, the picked-up image of the camera 11 is corrected to be suitable for the recognition process in the object recognizing unit 23, and the corrected image (image G2) is output. Further, in the present embodiment, the tag information according to the recognition result of the object recognizing unit 23 is superimposed on the image G1, and the superimposed image is displayed on the touch panel 12. Because the image easily viewable for the worker W is displayed on the touch panel 12 and the image suitable for image recognition is input to the object recognizing unit 23, it is possible to improve the visibility of the image for the worker W and to improve the recognition rate.

Additionally, in the present embodiment, the default value of the correction parameter to be used in the image correcting unit 21b is set by using the default value setting table TB. The default value setting table TB is a table in which the detection result of the sensor 13 is related to a setting value of the correction parameter when the recognition process of the object recognizing unit 23 was successful in the past. Also, in the present embodiment, the adjusting method is determined in accordance with the recognition result of the object recognizing unit 23. Therefore, it is possible to change the correction parameter to be used in the image correcting unit 21b into the exposure correction value suitable for the image recognition faster and more precisely than the first embodiment. As the result, when the marker M is taken with the camera 11, it is possible to immediately display the tag information as the work support information on the touch panel 12.

The information display apparatus 10 of the first embodiment and the information display apparatus 30 of the second embodiment include the camera 11 and touch panel 12. Also, the information display apparatus 10 and the information display apparatus 30 are portable apparatuses. For example, the information display apparatus 10 and the information display apparatus 30 are portable terminals with a camera such as a smart phone, a portable phone, a game machine, a tablet terminal, and a head-mounted display.

Although an information display apparatus and an information display method according to embodiments of the present invention have been described above, the present invention is not limited to the above-described embodiments, and can be freely modified within the scope thereof. For example, although the foregoing descriptions of the embodiments have been examples in which the image display apparatus provides information by "Marker-based AR" in "Vision-based AR", the present invention is applicable to an image display apparatus for providing information by "Marker-less AR" in "Vision-based AR".

In the embodiments described above, it is described that the work support information is the tag information. However, for example, the image display apparatus may provide helpful information for maintaining a maintenance manual of the field devices D1 to D3 with the tag information, in place of the tag information, or in relation to the tag information.

Also, in the first and second embodiment described above, it is described that the information display apparatus displays the tag information as the work support information for supporting maintenance of the field device D1 to D3 placed in a plant. However the image display apparatus of the present invention may be adaptable to various uses such as work support in a mining site, amusement such as games, guidance in museums or event sites, medical support, or the like.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An information display apparatus comprising:
an image pick-up unit which comprises an image pick-up element, the image pick-up unit being configured to pick up an image;
a display unit which comprises a display device, the display unit being configured to display the image picked up by the image pick-up unit; and
a processor configured to implement at least:
a first correcting unit configured to correct the image picked up by the image pick-up unit to generate a first image;
a second correcting unit configured to correct the image picked up by the image pick-up unit to generate a second image;
a recognizing unit configured to recognize the second image generated by the second correcting unit and generate a result of the recognition;
a display control unit configured to display, on the display unit, an additional information according to the result of the recognition of the second image performed by the recognizing unit, the additional information being superimposed on the first image generated by the first correcting unit; and
a sensor configured to detect brightness in photographic environments,
wherein the first correcting unit comprises:
a first adjuster configured to adjust a correction amount of the image picked up by the image pick up unit in accordance with a result of the detection performed by the sensor; and
a first corrector configured to correct the image picked up by the image pick-up unit based on the correction amount adjusted by the first adjusting section,
wherein the second correcting unit comprising:
a second adjuster configured to adjust a correction amount of the image picked up by the image pick up unit until a predetermined reference image is recognized by the recognizing unit; and
a second corrector configured to correct the image picked up by the image pick-up unit based on the correction amount adjusted by the second adjuster, and
wherein the second adjuster is configured to:
store a table designating a relation between the detection result of the sensor and the correction amount when the reference image had been recognized by the recognizing unit,
read out the correction amount according to the detection result of the sensor from the table, and
set the correcting amount read out from the table as a default value of the correction amount of the image picked up by the image pick up unit.

2. The information display apparatus according to claim 1, wherein
the second adjuster determines an adjusting method of the correction amount of the image in accordance with the recognition result of the recognizing unit when at least two correction amounts differing from each other are set.

3. The information display apparatus according to claim 1, wherein
each of the first and second correcting unit is configured to correct white balance and exposure of the image picked up by the image pick up unit.

4. The information display apparatus according to claim 1, wherein
the image pick-up unit is configured to pick up an image of a field device.

5. The information display apparatus according to claim 4, wherein
the recognizing unit is configured to recognize a marker placed on the field device.

6. The information display apparatus according to claim 5, wherein
the marker comprises:
a graphic for recognizing the marker; and
information assigned uniquely to the marker.

7. The information display apparatus according to claim 6, wherein
the recognizing unit is configured to extract an edge of the image generated by the second correcting unit where brightness of the second image generated by the second correcting unit is sharply changed at the edge.

8. The information display apparatus according to claim 7, wherein
the recognizing unit is configured to recognize the graphic from the edge extracted by the recognizing unit.

9. The information display apparatus according to claim 8, wherein
the recognizing unit is configured to compare a predetermined reference image with an image of the information assigned uniquely to the marker surrounded by the graphic recognized by the recognizing unit, and determine if the image of the information assigned uniquely to the marker matches the reference image.

10. The information display apparatus according to claim 4, wherein
the additional information includes work support information for supporting workers.

11. The information display apparatus according to claim 10, wherein
the work support information includes information for maintenance work of the field device.

12. The information display apparatus according to claim 1, further comprising:
a setting unit configured to set a first mode in which the additional information is superimposed on the first image or a second mode in which the additional information is not superimposed on the first image.

13. The information display apparatus according to claim 1, further comprising:
a memory that stores the additional information; and
a managing unit configured to manage the additional information stored in the memory.

14. The information display apparatus according to claim 13, further comprising:
a communicating unit configured to receive additional information from a server; and to supply the additional information to the managing unit.

15. The information display apparatus according to claim 14, wherein
the managing unit is configured to receive the additional information received from the communicating unit and replace the additional information supplied from the communicating unit for the additional information stored in the memory.

16. A control device comprising:
a processor configured to implement at least:
a first correcting unit configured to correct an image to generate a first image;
a second correcting unit configured to correct the image to generate a second image;
a recognizing unit configured to recognize the second image generated by the second correcting unit;
a display control unit configured to display, on a display unit, an additional information according to a result of the recognition performed by the recognizing unit with the additional information superimposed on the first image generated by the first correcting unit; and
a sensor configured to detect brightness in photographic environments,
wherein the first correcting unit comprises:
a first adjuster configured to adjust a correction amount of the image in accordance with a result of the detection performed by the sensor; and
a first corrector configured to correct the image based on the correction amount adjusted by the first adjusting section,
wherein the second correcting unit comprising:
a second adjuster configured to adjust a correction amount of the image until a predetermined reference image is recognized by the recognizing unit; and
a second corrector configured to correct the image based on the correction amount adjusted by the second adjuster, and
wherein the second adjuster is configured to:
store a table designating a relation between the detection result of the sensor and the correction amount when the reference image had been recognized by the recognizing unit,
read out the correction amount according to the detection result of the sensor from the table, and
set the correcting amount read out from the table as a default value of the correction amount of the image.

17. An information display method comprising:
picking up an image by an image pick-up unit which comprises an image pick-up element;
correcting, by a processor, the image picked up by the image pick-up unit to generate a first image;
correcting, by the processor, the image picked up by the image pick-up unit to generate a second image;
recognizing the second image by the processor;
displaying, by the processor, on a display unit, an additional information according to a result of the recognition with the additional information superimposed on the first image;
detecting, by a sensor, brightness in photographic environments;
adjusting, by the processor, a correction amount of the image in accordance with a result of the detection performed by the sensor;
correcting, by the processor, the image picked up by the image pick-up unit based on the correction amount adjusted by the processor;

adjusting, by the processor, a correction amount of the image picked up by the image pick up unit until a predetermined reference image is recognized by the processor;

correcting, by the processor, the image picked up by the image pick-up unit based on the correction amount adjusted by the processor;

storing, by the processor, a table designating a relation between the detection result of the sensor and the correction amount when the reference image had been recognized by the processor;

reading out, by the processor, the correction amount according to the detection result of the sensor from the table; and setting, by the processor, the correcting amount read out from the table as a default value of the correction amount of the image picked up by the image pick up unit.

* * * * *